(12) United States Patent
Chambrion et al.

(10) Patent No.: US 8,579,095 B2
(45) Date of Patent: Nov. 12, 2013

(54) CLUTCH HAVING A PRE-CLUTCH AND A MAIN CLUTCH

(75) Inventors: Martin Chambrion, Herrlisheim (FR); Christoph Raber, Ottweiler-Steinbach (DE); Yannick Simon, Lauterbourg (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/458,114

(22) Filed: Apr. 27, 2012

(65) Prior Publication Data

US 2012/0241277 A1 Sep. 27, 2012

Related U.S. Application Data

(63) Continuation of application No. PCT/DE2010/001224, filed on Oct. 18, 2010.

(30) Foreign Application Priority Data

Oct. 29, 2009 (DE) .......................... 10 2009 051 243
Dec. 21, 2009 (DE) .......................... 10 2009 059 738
Jun. 29, 2010 (DE) .......................... 10 2010 025 411

(51) Int. Cl.
*F16D 21/08* (2006.01)
*F16D 13/04* (2006.01)
*F16D 13/52* (2006.01)

(52) U.S. Cl.
USPC ....... 192/35; 192/48.7; 192/70.23; 192/110 B

(58) Field of Classification Search
USPC ......................... 192/35, 54.52, 48.7
See application file for complete search history.

(56) References Cited

U.S. PATENT DOCUMENTS

| 3,000,479 | A | * | 9/1961 | Mosbacher ..................... 192/35 |
| 4,645,049 | A |   | 2/1987 | Matsuda et al. |
| 5,533,603 | A | * | 7/1996 | Terranova et al. ............. 192/35 |
| 2005/0167229 | A1 |   | 8/2005 | Tsukada et al. |

FOREIGN PATENT DOCUMENTS

| GB | 2251465 |   | 7/1992 |
| JP | 55-047018 | A * | 4/1980 |
| JP | 2005344920 |   | 12/2005 |

* cited by examiner

*Primary Examiner* — Richard M. Lorence
(74) *Attorney, Agent, or Firm* — Simpson & Simpson, PLLC

(57) ABSTRACT

A clutch including a pre-clutch and a main clutch, where the pre-clutch can be brought into an engaged or disengaged state by a disc spring, where the pre-clutch is connected via an effective connection to the main clutch, such that in the disengaged position and engaged position are transmitted to the main clutch, where the pre-clutch is arranged between the main clutch and a connection area for an actuating element of the disc spring, that the disc spring is effectively connected to an outer area by means of a clutch hub of the pre-clutch, that the disc spring is effectively connected in a middle area to a disc of the counter-disc of the pre-clutch, and that the disc spring has a contact area for the actuating element in an inner area.

15 Claims, 7 Drawing Sheets

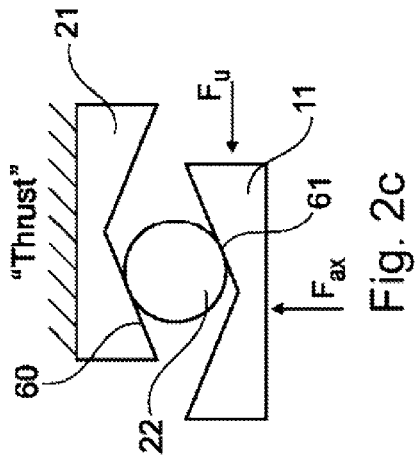
Fig. 2a
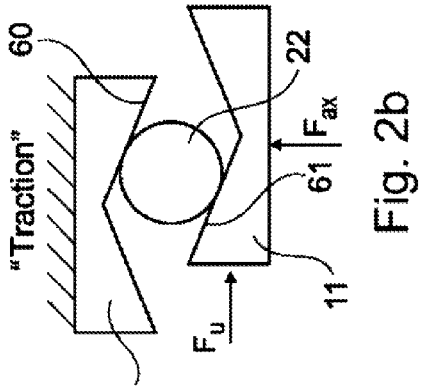
Fig. 2b
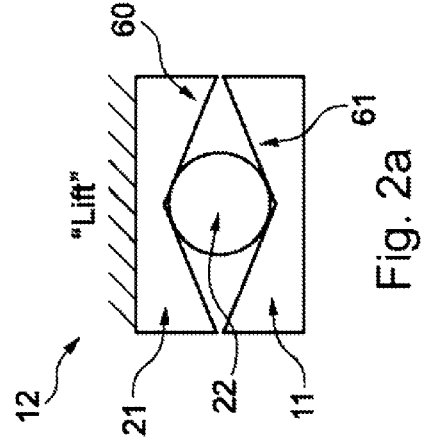
Fig. 2c
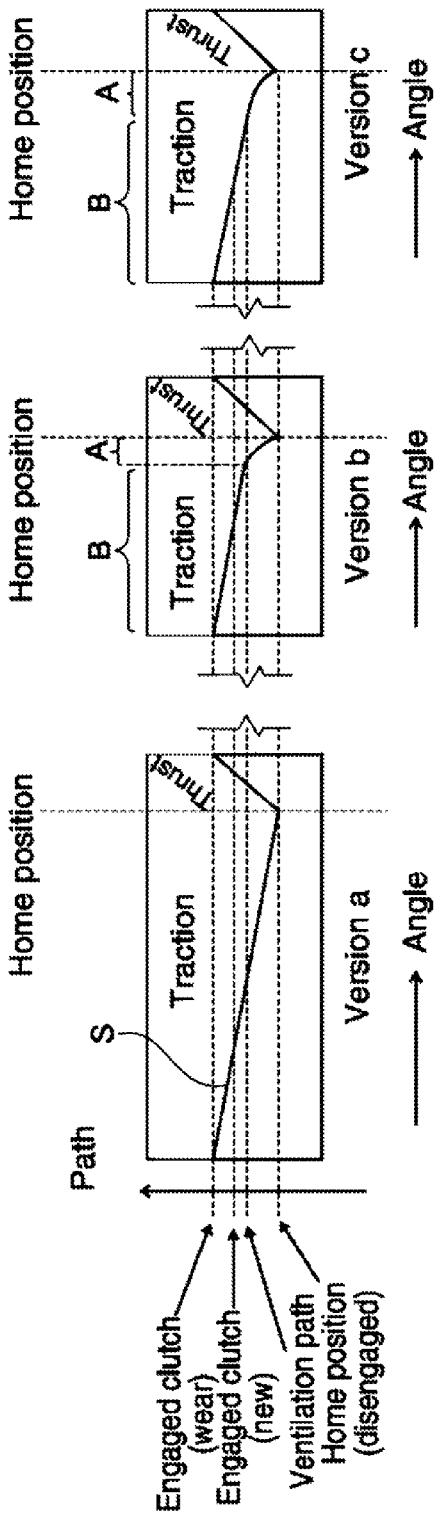
Fig. 2d
Fig. 2e
Fig. 2f

CLUTCH HAVING A PRE-CLUTCH AND A MAIN CLUTCH

CROSS-REFERENCE TO RELATED APPLICATIONS

This application is filed under 35 U.S.C. §120 and §365(c) as a continuation of International Patent Application No. PCT6E2010/001224 filed Oct. 18, 2010, which application claims priority from German Patent Application No. 10 2009 051 243.8 filed Oct. 29, 2009, German Patent Application No. 10 2009 059 738.7 filed Dec. 21, 2009, and German Patent Application No. 10 2010 025 411.8 filed Jun. 29, 2010, which applications are incorporated herein by reference in their entireties.

FIELD OF THE INVENTION

The invention relates to a clutch having a pre-clutch and a main clutch.

BACKGROUND OF THE INVENTION

A clutch is known in the prior art from European Patent No. 1685332 B1, having a pre-clutch and a main clutch.

Thus, there is a long-felt need for an improved clutch having a pre-clutch and a main clutch.

BRIEF SUMMARY OF THE INVENTION

One object of the invention is that the pre-clutch can be arranged between the main clutch and the actuating element of the pre-clutch. Furthermore, a radial outside area of the clamping means of the pre-clutch is effectively connected to a clutch hub of the pre-clutch, and the radial middle area of the clamping means is effectively connected to a disc or counter-disc of the pre-clutch. In the area lying radially to the inside, the clamping means has a contact area for the actuating element. This arrangement reduces the inertia of the pre-clutch. The dynamics of the clutch are therefore significantly improved.

In one embodiment, a clutch basket of the pre-clutch is rotatably mounted by a bearing to the clutch hub of the pre-clutch. In another embodiment, a clutch hub of the main clutch is connected via a torque damper, especially via spring means, to the clutch hub of the pre-clutch. In yet another embodiment, a clutch hub of the pre-clutch is mounted via a second bearing to a clutch basket of the main clutch. In yet another embodiment, a second clamping means is provided that clamps the disc and counter-disc of the pre-clutch against each other.

In another embodiment, a third clamping means is provided that pretensions the main clutch in the direction of engagement.

In yet another embodiment, means, for example, a tension spring, pressure spring, rubber pressure piece and/or a damper, are provided that improve the effective connection between the main clutch and the pre-clutch. In particular, these means can dampen vibration or grabbing by the pre-clutch. This feature is independent from the design of the clutch and can be used in various embodiments.

In another embodiment, the first and/or second bearing has means for generating basic friction, where the means are preferably designed in the form of a friction disc and/or in the form of a spring means for adjusting the friction of the bearing. For example, this can dampen the vibration of the pre-clutch. This feature is independent from the design of the clutch and can be used in various embodiments.

In yet another embodiment, the main clutch is effectively connected via a torque damper, such as spring means, to the pre-clutch.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which:

FIG. 2 displays representations of slopes of ramp surfaces of a ramp device;

DETAILED DESCRIPTION OF THE INVENTION

At the outset, it should be appreciated that like drawing numbers on different drawing views identify identical, or functionally similar, structural elements of the invention.

While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
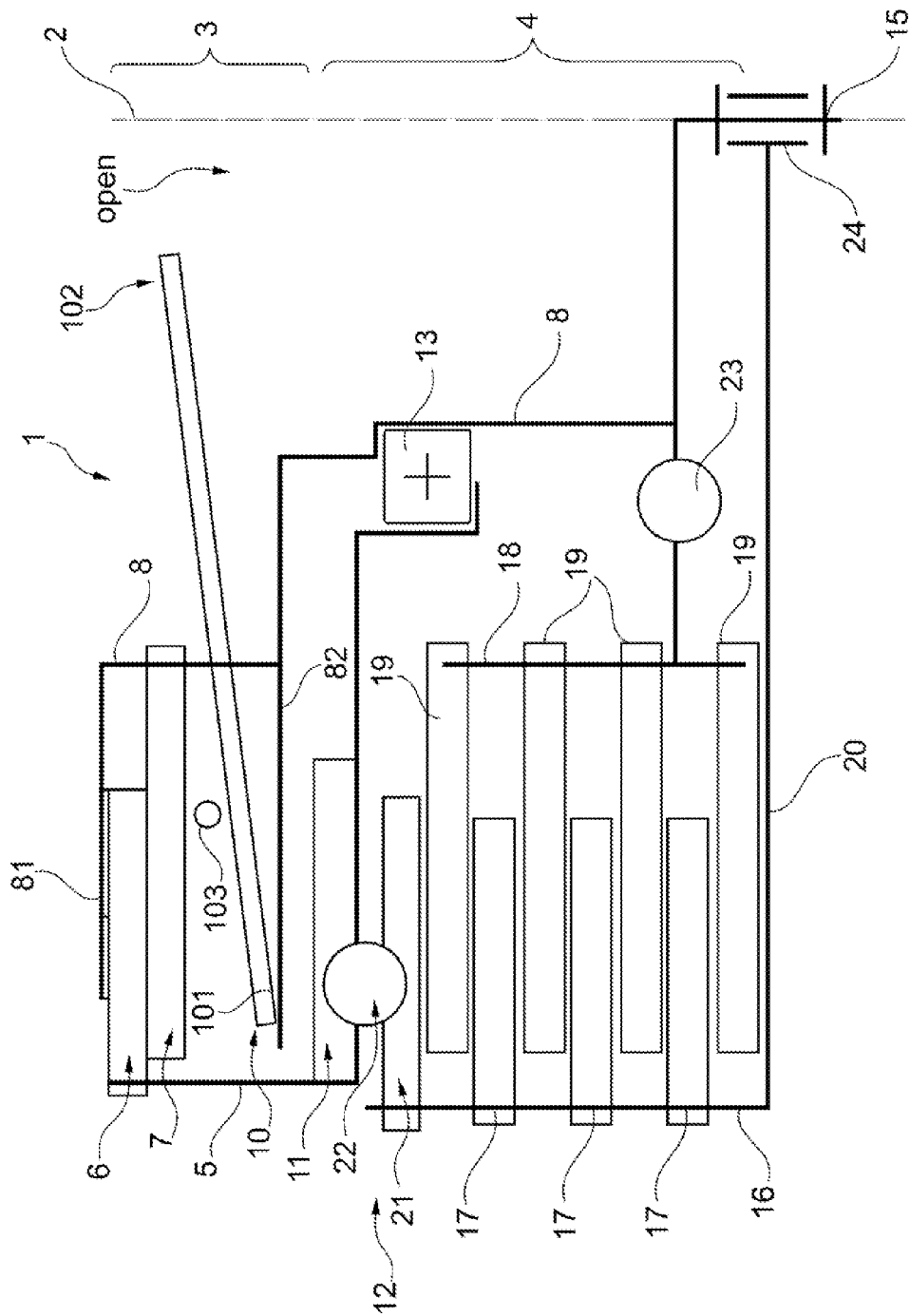
FIG. 1 shows a schematic representation of a first clutch embodiment.

FIG. 1 shows a schematic representation of a partial section of one half of clutch 1. arranged around rotational axis 2 having pre-clutch 3 and main clutch 4. Clutch 1 is a wet clutch. Pre-clutch 3 and the main clutch are effectively connected to each other by means of effective connection means 12. In first clutch basket 5 of pre-clutch 3, first disc 6 is suspended non-rotatably and slightly shiftable axially along rotational axis 2, and, for example, includes drivers or friction discs coated with friction material. Only first disc 6 is shown in the portrayed embodiment. Plurality of first discs 6 can also be provided. In addition, each first disc 6 is assigned first counter-disc 7, where first counter-discs 7 are accommodated non-rotatably and axially movable along rotational axis 2 in first clutch hub 8 of pre-clutch 3. In one embodiment, first clutch hub 8 is connected to transmission input shaft 15. First disc 6 is a driver disc, and the first counter-disc is a disc. First counter-discs 7 are, for example, made of steel.

First clutch hub 8 has outer and inner plates 81, 82, between which first disc 6 and first counter-disc 7 are arranged. Furthermore, clamping means 10, for example, in the form of a disc spring that compresses first disc 6 and first counter-disc 7, and therefore, connects first clutch basket 5 to first clutch hub 8 non-rotatably, thereby engaging clutch 3. First clutch basket 5 is rotatably mounted by means of bearing 13 to first clutch hub 8. When pre-clutch 3 is disengaged, first clutch basket 5 can rotate in relation to first clutch hub 8.

Clamping means 10 rests against inner plate 82 in radially outside area 101. In radially middle area 103, first clamping means 10 lies against the bottom side of first counter-disc 7. In a radially inner area, clamping means 10 has another contact area 102 for an effective connection to an actuating element.

First clutch basket 5 has first ramp ring 11 that is assigned to second ramp ring 21 of main clutch 4. First ramp ring 11 is, for example, part of a connecting piece of first clutch basket 5 that is guided to bearing 13. Transmission element 22 is formed between first ramp ring 11 and second ramp ring 21, for example, in the shape of a ball. First ramp ring 11, transmission element 22, and second ramp ring 21 represent effective connection means 12 between pre-clutch 3 and main clutch 4.

Second ramp ring 21 can be designed as part of a cover of main clutch 4. Second ramp ring 21 is fastened non-rotatably and slightly axially shiftable along rotational axis 2 in second clutch basket 16 of main clutch 4. Main clutch 4 has two discs 17 that are suspended non-rotatably and slightly axially shiftable along rotational axis 2 in second clutch basket 16. In addition, main clutch 4 has second clutch hub 18 in which two counter-discs 19 are suspended non-rotatably and slightly axially shiftable along rotational axis 2. Second discs 17 and second counter-discs 19 are arranged in alternate layers as shown in FIG. 1. Second clutch hub 18 is connected via torque damper 23 to first clutch hub 8. Torque damper 23 is designed in the form of a helical spring and represents an elastic connection between first clutch hub 8 and second clutch hub 18. Second discs 17 are, for example, made of driver or friction discs coated with friction material. Second counter-discs 19 are, for example, made of steel. Second discs 17 and second counter-discs 19 are arranged between second ramp ring 21 and second plate 20. In one embodiment, second plate 20 is a part of second clutch basket 18 and is guided to engine input connection 24.

First effective connecting means 12 is a ramp device in the form of first ramp ring 11 and second ramp ring 21, where first ramp ring 11 and second ramp ring 21 have sloped surfaces on facing sides. Transmission element 22 is arranged between the sloped surfaces. The basic function of the ramp device is to shift second ramp ring 21 a greater or lesser distance toward second plate 20, depending on the windup angle between first ramp ring 11 and second ramp ring 21. The path of movement is designed such that main clutch 4 is engaged or disengaged, depending on the windup angle.

In one embodiment, transmission element 22 can also be designed in the form of cylindrical rollers. For example, three or more balls or cylindrical rollers can be provided to convert the twist of first ramp ring 11 in relation to second ramp ring 21 into an axial movement of second ramp ring 21 toward second plate 20 and thereby engage main clutch 4.

If clamping means 10 is not actuated, a friction lock forms between first disc 6 and second counter-disc 7 and thereby engages pre-clutch 3. If torsion results between first ramp ring 11 and second ramp ring 21 due to differences in torque between transmission input shaft 15 and engine output 24 when pre-clutch 3 is engaged, main clutch 4 is automatically engaged in a friction lock. After the internal combustion engine starts, second clutch basket 16 and second ramp ring 21 rotate in relation to first ramp ring 11 in response to torque on transmission input shaft 15, for example, from an engaged gear, or slip torque when pre-clutch 3 is engaged. Transmission element 22 is shifted onto a rising ramp in the direction of tension, where axially fixed first ramp ring 11 axially shifts the axially shiftable ramp ring 21 toward second plate 20. By means of the axial movement of second ramp ring 21, layered second discs 17 and second counter-discs 19 are clamped together and engaged in a friction lock. This friction locks main clutch 4.

To disengage clutch 1, pre-clutch 3 merely has to be disengaged by actuating clamping means 10 toward main clutch 4. Pre-clutch 3 is designed such that pre-clutch 3 is engaged when clamping means 10 is not actuated. Pre-clutch 3 is a so-called active clutch, where clamping means 10 lies against first clutch hub 8. This significantly reduces the inertia of pre-clutch 3. The dynamics of clutch 1 are therefore significantly improved. In one embodiment, torque damper 23 can also be discarded. Torque damper 23 ensures that the load change is dampened between engine connection 24 and transmission input shaft 15.

FIGS. 2a, 2b and 2c show a schematic representation of three positions of effective connection means 12, which clarifies the operation of the ramp rings. FIGS. 2a, 2b and 2c each show a section of first ramp ring 11, second ramp ring 21, and transmission element 22, in the form of a ball. The cross-sections run along a radial circumference in reference to a circle midpoint of first ramp ring 11 and second ramp ring 21. First ramp ring 11 and second ramp ring 21 each have a ramp surface 60, 61, respectively. FIG. 2a shows an initial position in which pre-clutch 3 is disengaged, and no force is transmitted from pre-clutch 3 to main clutch 4. FIG. 2b shows a tension position in which pre-clutch 3 is engaged, and second ramp ring 21 is twisted in relation to first ramp ring 11 due to the accumulated torque. Since first ramp ring 11 is clamped in an axial direction, force is exerted on second ramp ring 21 due to angled ramp surfaces 60, 61, and second ramp ring 21 is moved downward toward second plate 20. This engages main clutch 4.

FIG. 2c depicts a state of thrust in which first ramp ring 11 advances ahead of second ramp ring 21, and second ramp ring 21 is pressed downward toward second plate 20 which reengages main clutch 4. Depending on the angles of the ramp surfaces, predetermined shifting functions can be set between pre-clutch 3 and main clutch 4.

FIGS. 2d, 2e and 2f show three diagrams of three different ramp surfaces in which path of travel S of the second ramp ring is plotted against displacement angle W between first ramp ring 11 and second ramp ring 21. The diagrams plot the resulting displacement path along which second ramp ring 21 is pushed towards second plate 20. One or two ramp surfaces can be used to realize the displacement path. In "Version a" shown in FIG. 2d, the rise of displacement path S is much steeper under thrust than under traction. The rise of the resulting displacement path remains constant on both sides of the home position. In "Version b" shown in FIG. 2e, the displacement path rises strongly in first section A starting from home position in the direction of traction, then transitions into a lesser slope in second section B. In "Version c" shown in FIG. 2f, the transition from the steeper section to the second flatter section is rounded on the pull side. The operation of the clutch can be improved by the different slopes of the thrust or traction displacement paths.

The design of the ramp surfaces can be harmonized with the two basic operating states of the clutch.

One state exists when the engine supplies positive torque, for example, when the driver presses the accelerator and thereby subjects clutch 1 to traction. When the engine supplies negative torque, for example, when braking the engine, the clutch is subject to thrust. As a function of traction mode or thrust mode, the pre-clutch accordingly twists in one or the other direction proceeding from home position relative to the main clutch. Ideally, maximum engine torque should be transmissible in traction mode. In contrast, reduced, limited engine torque is required in thrust mode. For example, when the clutch is used in a motorcycle, the rear wheel of the motorcycle can seize more easily in thrust mode. Whereas the rear wheel bears most of the weight of the motorcycle during acceleration (under a traction load), the front wheel assumes the weight of the motorcycle during braking while braking the engine and hence under a thrust load. This means that the skid limit of the rear wheel is reached faster in thrust load than in traction mode. For example, when downshifting from a gear with a higher transmission ratio to a gear with a lower transmission ratio, the engine briefly supplies high negative torque, which could cause the rear wheel to seize. Due to this situation, a lower slope of the effective ramp surface or ramp surfaces in traction mode is advantageous so that maximum torque can be transmitted to the engine. The skidding of the rear wheel while downshifting can, for example, be avoided when less transmissible torque arises in thrust mode. The pressure should be reduced, which can be generated by a steep slope.

The shape of the ramp surfaces, i.e., the slope of displacement path S proceeding from home position as a function of the windup angle also influences the dynamic sensitivity of the clutch in that the slope of the displacement path can shift the natural frequency of the pre-clutch. The steeper the slope of the displacement path, i.e., the steeper the incline of the ramp surfaces, the higher the natural frequency. This has a positive influence on the dynamics, but has a negative influence on the transmission of torque. It is therefore preferable to design the shape of the ramp surfaces such that the incline of the displacement path is in two steps as the windup angle increases as shown in FIG. 2. The effective traction ramp may not be steeper in the ventilation passage area since the main clutch is not yet engaged and not transmitting any torque. Consequently, a rounded transition between two sections A, B can be selected as shown in FIG. 2f. The advantage of the rounded transition between two sections A, B with different slopes is that the transmission means does not have to be lifted from the ramp surface.

Figure 3:
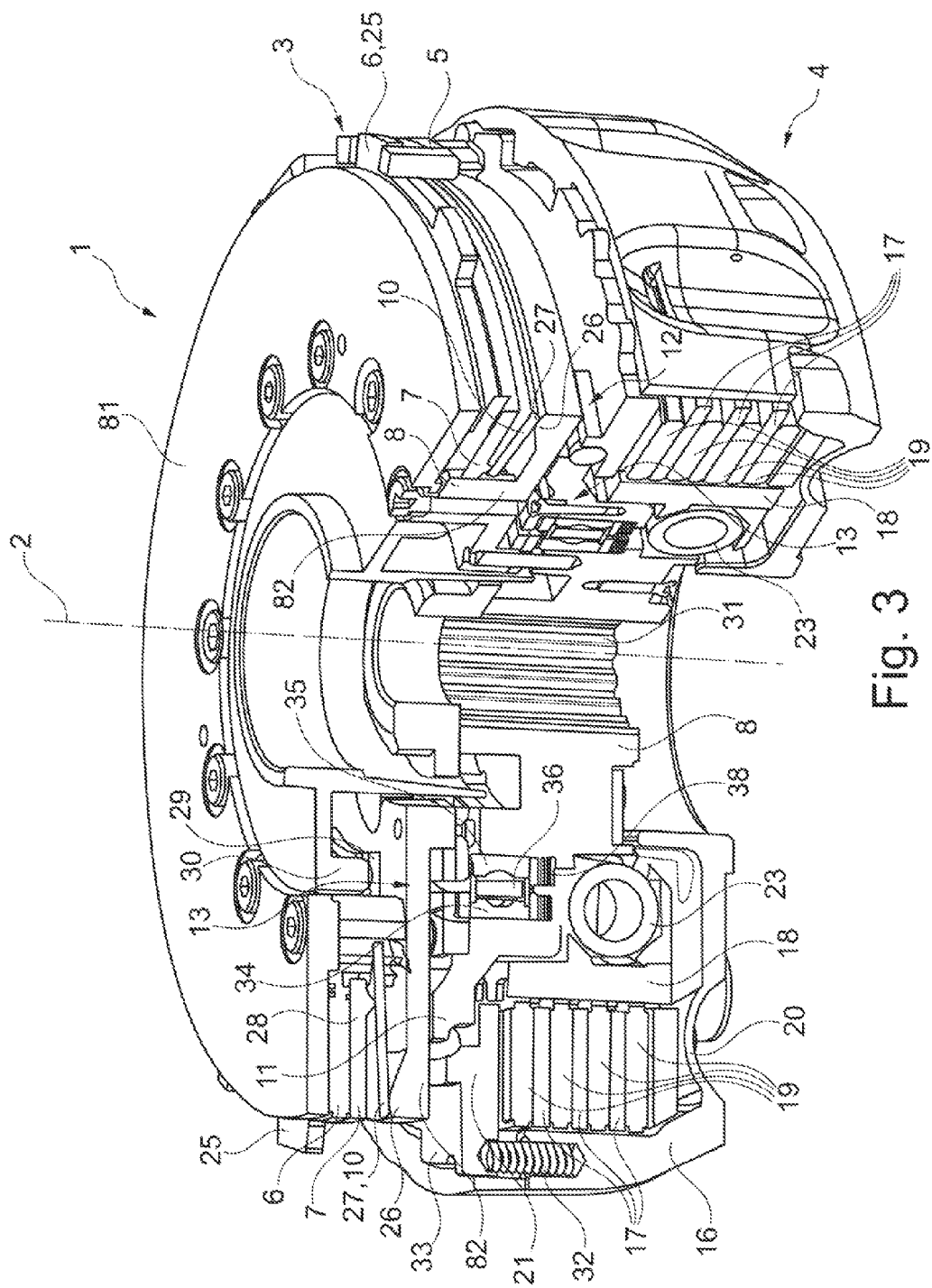
FIG. 3 shows a perspective partial cross-sectional view of the clutch illustrated in FIG. 1.

FIG. 3 shows a perspective view of a partial cross-sectional view of clutch 1. The pre-clutch is arranged in the top area that is effectively connected via effective connection means 12 to main clutch 4 arranged in the bottom area. Outer plate 81 is screwed tightly to inner plate 82. First disc 6 lies against the inside of outer plate 81 that is fixed by means of tabs 25 in a recess of first clutch basket 5 against rotating in relation to clutch basket 5, although an axial shift along rotational axis 2 is possible. First counter-disc 7 is arranged under first disc 6, which is suspended non-rotatably in first clutch hub 8. First counter-disc 7 is also mounted in first clutch hub 8 so as to be shiftable in an axial direction parallel to rotational axis 2.

Clamping means 10 is arranged in the form of a disk spring on a bottom side of counter-disc 7. Both first disc 6 and first counter-disc 7 as well as clamping means 10 can have the basic shape of a circular disc. Likewise, inner plate 82 has the basic shape of a circular disk, and inner plate 82 has annular bead 26 on a top side of the radial outside edge area that extends toward outer plate 81. Radial outer first edge area 27 of clamping means 10 lies on bead 26. Furthermore, a bottom side of first counter-disc 7 facing clamping means 10 has second annular peripheral bead 28 in a radial middle area. In one position, clamping means 10 exerts force on first counter-disc 7 by contacting second bead 28 such that first counter-disc 7 presses first disc 6 against outer plate 81 to establish a friction lock between first disc 6 and first counter-disc 7 to engage pre-clutch 3. In a radially inner area, clamping means 10 has contact surface 29 for actuating means 30. Actuating means 30 is designed in the form of an annular sleeve and is connected to an actuating element (not shown in FIG. 3) in the form of a clutch controller. To disengage clutch 1, actuating means 30 is pressed by the actuating element downward toward main clutch 4. This moves disc spring 10 toward inner plate 82 to release the initial tension on first counter-disc 7. This disengages the friction lock between first disc 6 and first counter-disc 7.

Inner plate 82 is connected to first clutch hub 8. First clutch hub 8 has hub 31 for connecting a transmission input shaft. First clutch basket 5 is connected to first ramp ring 11, and first ramp ring 11 is arranged below inner plate 82. Second ramp ring 21 is assigned to first ramp ring 11 and is arranged partially below first ramp ring 11. Second ramp ring 21 is pre-tensioned in the direction of first ramp ring 11 by a pre-tensioning spring 32 that abuts second clutch basket 16. Plurality of bias springs 32 is provided, whereas only one is shown. Second ramp ring 21 is simultaneously a cover for main clutch 4. Second ramp ring 21 can be shifted in an axial direction along rotational axis 2 by second tabs 33 in the recesses of second clutch basket 16; however, they are connected non-rotatably in a radial direction to second clutch basket 16. Furthermore, four second discs 17 are held non-rotatably but axially shiftable along rotational axis 2 in second clutch basket 16. Second clutch basket 16 is connected to second plate 20, where second plate 20 is connectable to the engine shaft. Main clutch 4 also has second counter-discs 19 that are held non-rotatably to second clutch hub 18 although shiftable in the axial direction of rotational axis 2. Second clutch hub 18 is coupled via plurality of torque dampers 23 designed in the form of helical springs to first clutch hub 8. Sensors 23 ensure that an elastic connection exists between first clutch hub 8 and second clutch hub 18 via helical springs 11.

First ramp ring 11 is rotatably supported about rotational axis 2 on first coupling hub 8 via bearing 13. Bearing 13 has outer bearing shell 34, inner bearing shell 35, and bearing rollers 36 arranged between them. Outer bearing shell 34 lies against first ramp ring 11. Inner bearing shell 35 lies against first clutch hub 8. Outer bearing shell 34 and inner bearing shell 35 roll on each other across bearing rollers 36.

Figure 4:
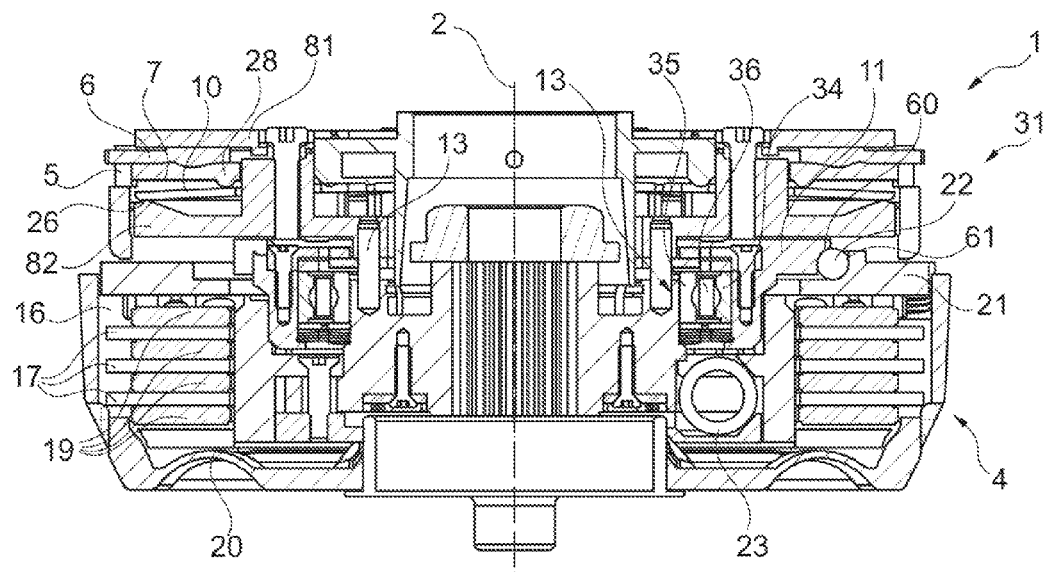
FIG. 4 shows a cross-sectional view through the middle of the clutch from FIG. 3.

FIG. 4 shows another cross-sectional view of clutch 1 through rotational axis 2 and the middle of clutch 1.

Figure 5:
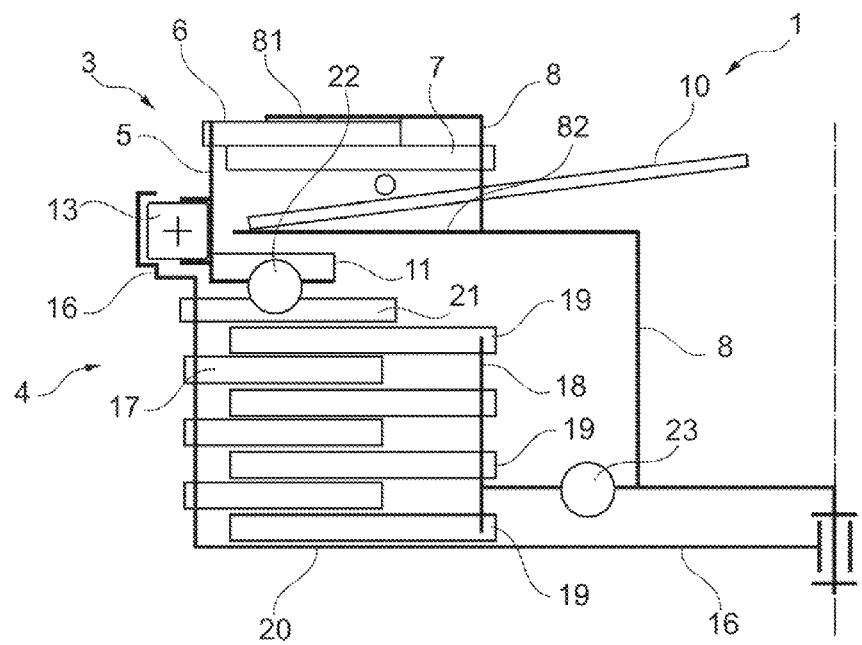
FIG. 5 shows a schematic representation of a second clutch embodiment.

FIG. 5 shows a schematic representation of another embodiment of clutch 1 that has substantially the same design as in FIGS. 1 through 3. In contrast to the embodiment in FIGS. 1 through 3, bearing 13 is arranged between first clutch basket 3 and second clutch basket 16 in this embodiment. In another embodiment, the bearing can also have means for the basic friction as shown in FIGS. 3 and 4.

Figure 6:
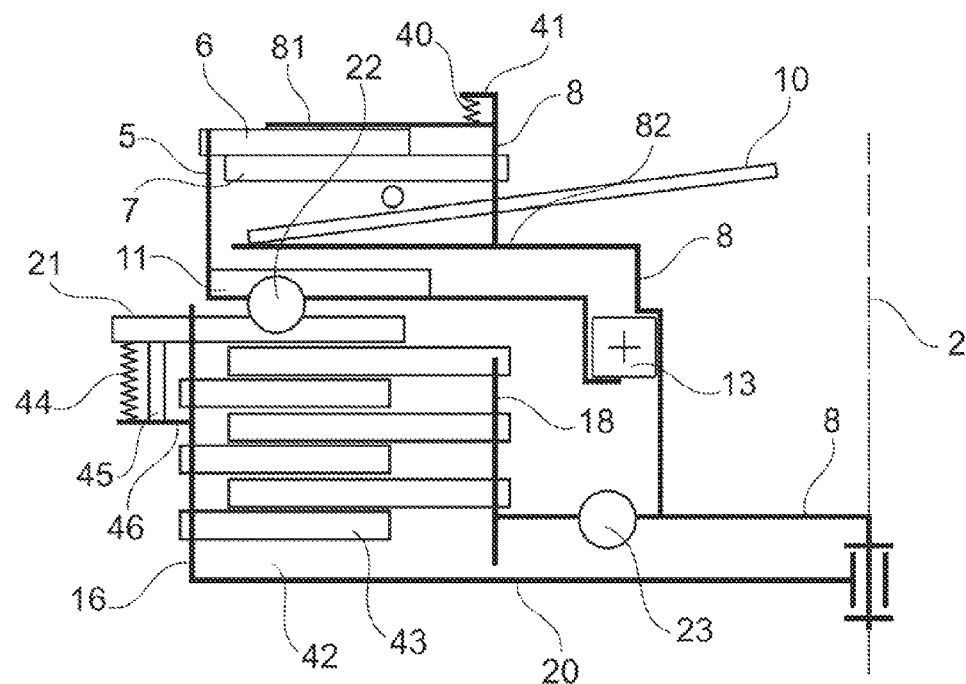
FIG. 6 shows a schematic representation of a third clutch embodiment.

FIG. 6 shows another embodiment similar to FIG. 1 where a pre-tensioning spring 40 is also provided, and outer plate 81 is movably pre-tensioned in an axial direction with the assistance of pre-tensioning spring 40 parallel to rotational axis 2 against stop 41 of first clutch hub 8 in the direction of first disc 6. Lining resilience is thereby provided in pre-clutch 3. This improves the initial operation of clutch 1.

In addition, second pre-tensioning spring 42 is provided that is clamped between second plate 20 and bottom second disc 43. Lining resilience is thereby provided in main clutch 4. In another embodiment, additional spring means 44 and/or damping means 45 can be provided to give second ramp ring 21 a defined torsion and/or pressure or damping. In one embodiment, spring means 44 and damping means 45 are arranged between second stop 46 of second clutch basket 16 and second ramp ring 21. The damping means can, for example, be designed in the form of a rubber element or a damping plunger.

Figure 7:
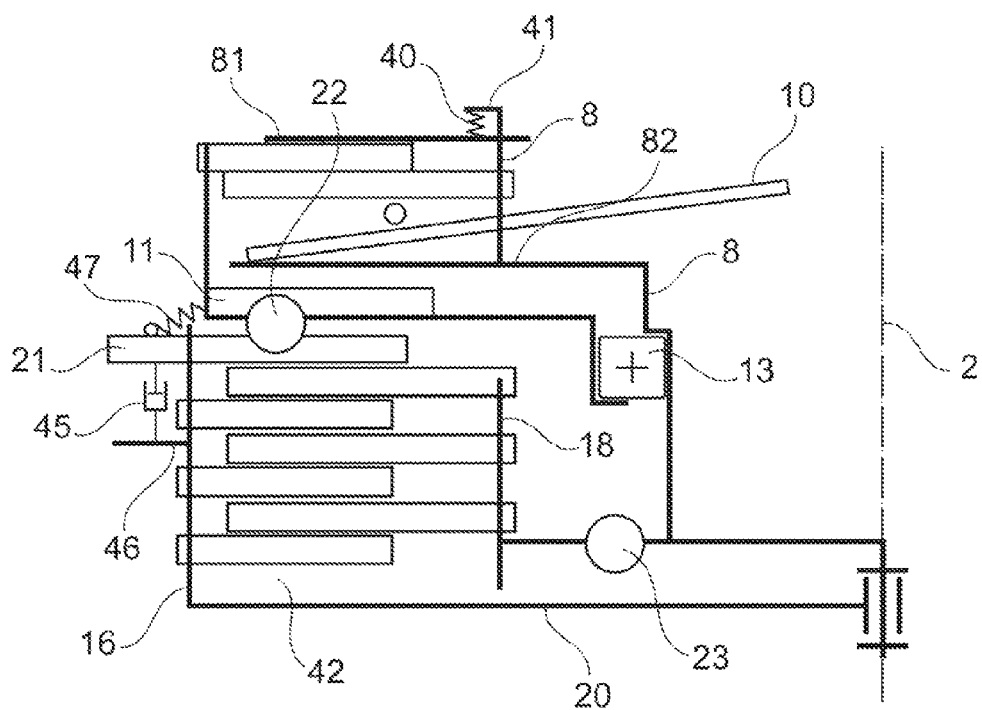
FIG. 7 shows a schematic representation of a fourth clutch embodiment.

In another embodiment, shown in FIG. 7 and similar to that shown in FIG. 6, damping means 45 are arranged between second ramp ring 21 and second stop 46.

Furthermore, second spring means 47 are clamped between first ramp ring 11 and second ramp ring 21. Second spring means 47 is, for example, designed in the form of a tension spring. In one embodiment, spring means 47 could also be designed in the form of a compression spring. Pretension is thereby enabled between first ramp ring 11 and second ramp ring 21.

Figure 8:
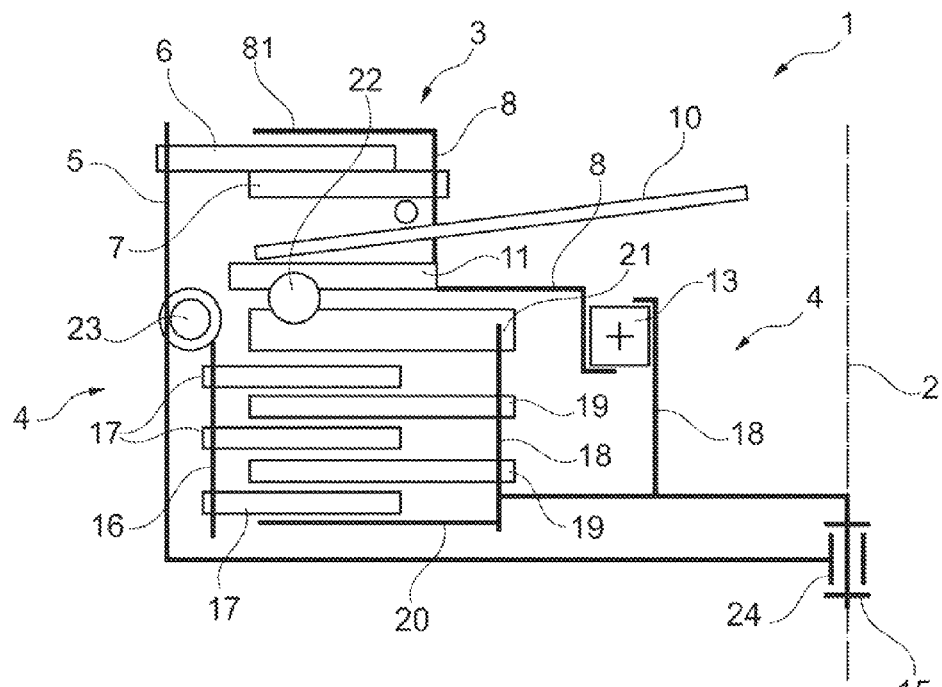
FIG. 8 shows a schematic representation of a fifth clutch embodiment.

FIG. 8 shows another embodiment of clutch 1 similar to that shown in FIG. 1, although torque damper 23 is arranged between first clutch basket 5 and second clutch basket 16. In addition, first clutch basket 5 is connected to engine connection 24. In addition, second clutch hub 18 is connected to transmission input shaft 15. Second plate 20 is connected to second clutch hub 18. First clutch hub 8 rotatably abuts second clutch hub 18 via bearing 13. Second ramp ring 21 is fastened to second clutch hub 18. First ramp ring 11 is fastened to first clutch hub 8. Clamping means 10 abuts first ramp ring 11. In one embodiment, first clutch basket 5 can also be coupled to a transmission input shaft, and second clutch hub 18 can be coupled to an engine shaft. Bearing 13 can be designed with or without means to variably set the basic friction.

Figure 9:
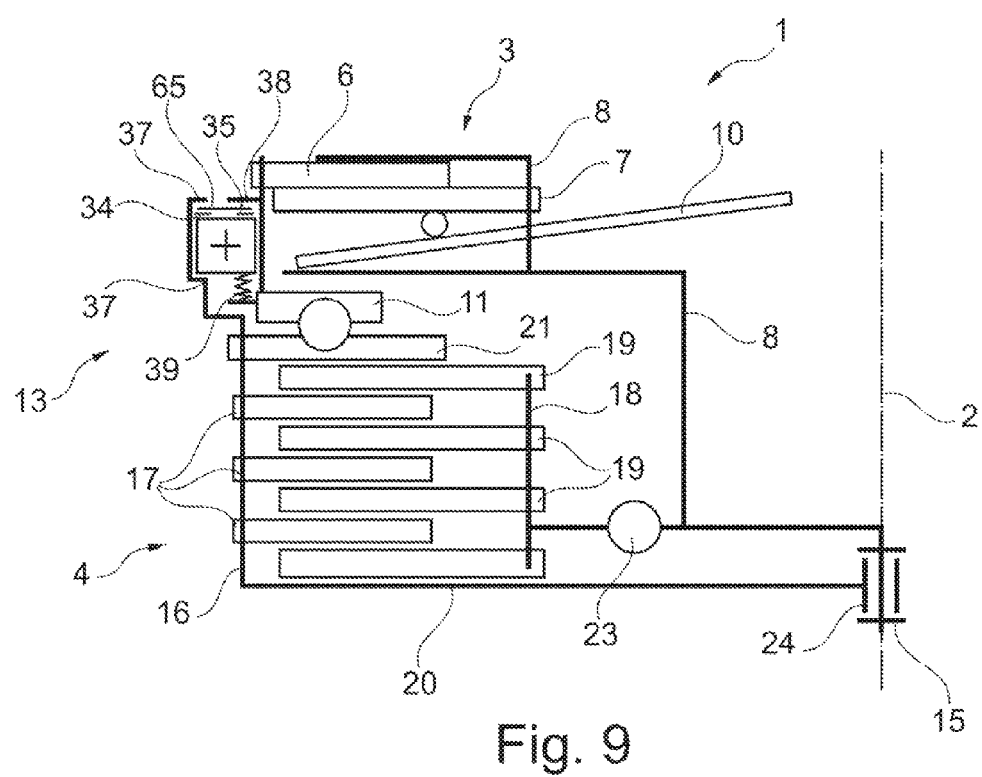
FIG. 9 shows a schematic representation of a sixth clutch embodiment.

FIG. 9 shows the embodiment depicted in FIG. 5 with a schematic representation of bearing 13 having means for the basic friction. The basic friction in bearing 13 can, for example, be achieved with friction disc 65 that is inserted between bearing shells 34, 35 and contact surfaces 37, 38. In addition, clamping means 39 is provided which is clamped between contact surfaces 37, 38 formed on first clutch basket 5 and second clutch basket 16 and bearing shells 34, 35. The goal of the basic friction is to brake the relative rotational movement between outer bearing shell 34 and inner bearing shell 35 of bearing 13. This can dampen the rotational vibration of pre-clutch 3 in relation to the engine. This is achieved by pre-tensioning the bearing shells with the assistance of clamping means 39. The pre-tensioning from clamping means 39 also affects both sides of the friction disc such that frictional torque is generated between pre-clutch 3 and engine, where both the outer bearing shell and the inner bearing shell rub against the friction disc. This brakes the torsion between the pre-clutch and main clutch. When main clutch 4 transmits torque, pressure arises on bearing 13, which modulates the frictional torque in bearing 13. The pressure also acts on the pre-clutch and clamps clamping means 39. This additional force attenuates the pre-tension on inner bearing shell 35 so that the frictional torque on inner bearing shell 35 is at least reduced or completely eliminated. The basic friction system of bearing 13 can accordingly be influenced by the pressure of the main clutch. As long as the pressure from main clutch 4 is greater than the pressure from clamping means 39, the basic friction is inactive. In contrast, when the pressure from the main bearing is low, such as while engaging, the bearing rotation is braked.

During a synchronization phase of clutch 1, that is, when the transmission is progressively being connected to the engine, pre-clutch 3 can be excited to vibrate, which then causes the clutch to grab. During this phase, the pressure of main clutch 4 continuously increases. Since the basic friction system of bearing 13 depends on the pressure from main clutch 4, the pre-clutch is increasingly braked as the pressure decreases. This can reduce the grabbing of the clutch.

Figure 10:
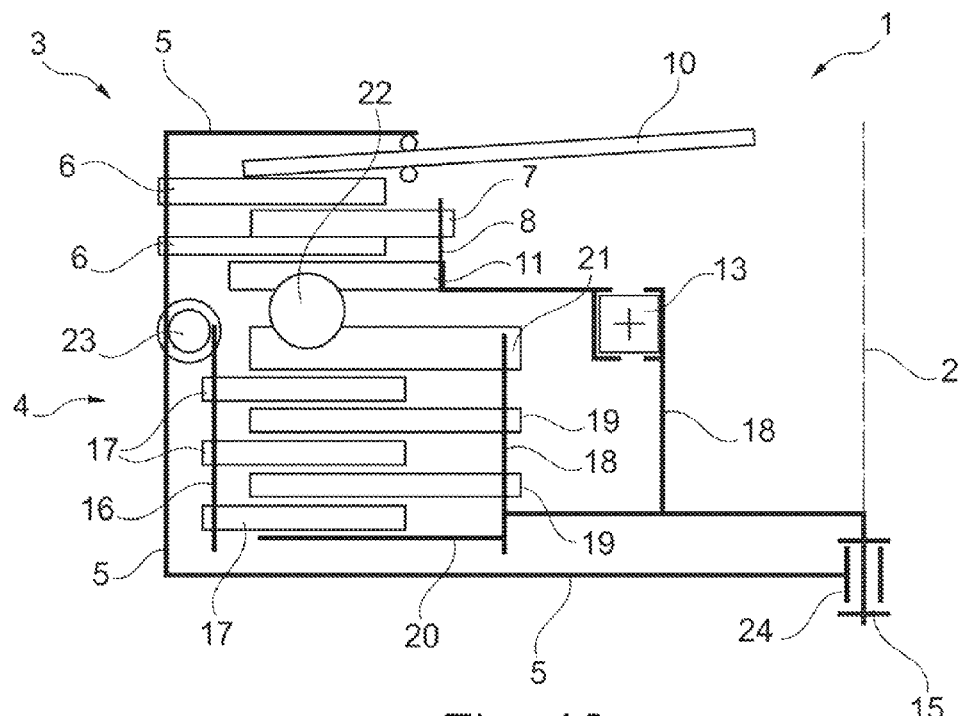
FIG. 10 shows a schematic representation of a seventh clutch embodiment.

FIG. 10 shows another embodiment similar to that shown in FIG. 8, where the pre-clutch is designed as an active clutch. In this embodiment, clamping means 10 is arranged such that the clamping means abuts first clutch basket 5. In this embodiment, first clutch hub 8 is connected to an engine output. Second clutch hub 18 is connected to an input of a transmission. In this embodiment, pre-clutch 3 is only connected to the engine when the pre-clutch is engaged. When the clutch pedal is pressed, the acceleration of the engine does not affect in the pre-clutch. First ramp ring 11 is not activated.

Figure 11:
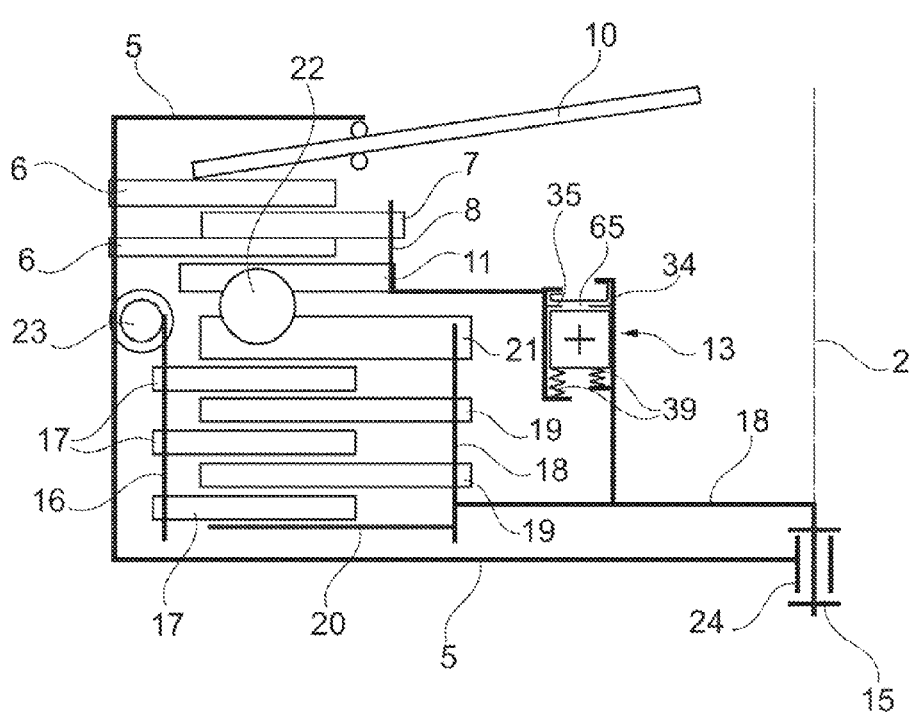
FIG. 11 shows a schematic representation of an eighth clutch embodiment.

FIG. 11 shows another embodiment of the clutch similar to that shown in FIG. 10, where bearing 13 has friction disc 65 and clamping means 39 that can set the basic friction according to the function as described in FIG. 9. This can reduce the vibration resonance of pre-clutch 3. Clamping means 39 and the friction disc are thereby effectively connected to the outer bearing shell 34 and/or inner bearing shell 35, such that the basic friction on bearing 13 depends on the pressure from main clutch 4. Once the pressure from main clutch 4 is less than the pressure from clamping means 39, basic friction arises, and the rotation of bearing 13 is braked. Once the pressure from main clutch 4 is greater than the pressure from clamping means 39, the basic friction is inactive.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

List of Reference Characters
1 Clutch
2 Rotational axis
3 Pre-clutch
4 Main clutch
5 First clutch basket
6 Disc
7 Counter-disc
8 First clutch hub
10 Clamping means
11 First ramp ring
12 Effective connection means
13 Bearing
15 Transmission input shaft
16 Second clutch basket
17 Second discs
18 Second clutch hub
19 Second counter-discs
20 Second plate 21 Second ramp ring
22 Transmission element
23 Torque damper
24 Engine connection
25 Tab
26 Bead
27 First edge area
28 Second bead
29 Contact surface
30 Actuating means
31 Hub
32 Pre-tensioning spring
33 Second tab
34 Outer bearing shell
35 Inner bearing shell
36 Bearing roller
37 First contact surface
38 Second contact surface
39 Clamping means
40 Pre-tensioning spring
41 Stop
42 Second pre-tensioning spring
43 Bottom second disc
44 Spring means
45 Damping means
46 Second stop
60 Ramp surface
61 Ramp surface
65 Friction means
81 Outer plate
82 Inner plate
102 Additional contact area
101 Outer area
103 Middle area

What is claimed is:

1. A clutch comprising:
a pre-clutch; and,
a main clutch, wherein the pre-clutch can be brought into an engaged or disengaged state by a clamping means, wherein the pre-clutch is connected via an effective connection to the main clutch, such that the disengaged state and engaged state are transmitted to the main clutch, wherein:
the pre-clutch is arranged between the main clutch and an outer plate rotatably fixed to a clutch hub of the pre-clutch;
the clamping means rests against an inner plate of the pre-clutch in a radially outer area;
the clamping means is effectively connected in a middle area to a counter-disc of the pre-clutch;
the clamping means has a contact area for an actuating element of the clamping means in an inner area;
a clutch basket of the pre-clutch is rotatably mounted to the clutch hub of the pre-clutch by means of a bearing;
a transmission element is arranged between a ramp ring of the pre-clutch and a ramp ring of the main clutch; and
the bearing has means for generating basic friction, including a friction disc, and spring means for setting the friction.

2. The clutch as recited in claim 1, wherein the main clutch is effectively connected via a torque damper, including a spring means, to the pre-clutch.

3. The clutch as recited in claim 1, wherein the pre-clutch has a disc that is suspended in a clutch basket of the pre-clutch, wherein the pre-clutch has a counter-disc that is suspended in a clutch hub of the pre-clutch, and wherein a pre-tensioning spring is provided that pre-tensions the disc and the counter-disc in the direction of the clamping means.

4. The clutch as recited in claim 1, wherein the main clutch has a disc and a counter-disc that can be friction-locked to a cover, and that a second pre-tensioning spring is provided that pre-tensions the disc and the counter-disc in the direction of the cover.

5. The clutch as recited in claim 1, wherein the effective connection between the pre-clutch and the main clutch is provided by the ramp ring of the pre-clutch that is effectively connected via the transmission element to the ramp ring of the main clutch, such that a twist of the main clutch in relation to the pre-clutch disc is converted into an axial shift of the ramp ring of the main clutch, wherein means are provided, which improve the effective connection between the ramp ring of the main clutch and the ramp ring of the pre-clutch, wherein a tension spring, compression spring, rubber pressure piece or a damper are provided.

6. The clutch as recited in claim 5, wherein the ramp ring of the pre-clutch and the ramp ring of the main clutch have ramp surfaces that are designed such that differently angled ramp surfaces are active for thrusting and traction, wherein sections act with different slopes.

7. The clutch as recited in claim 5, wherein the ramp ring of the pre-clutch or the ramp ring of the main clutch have ramp surfaces that are designed such that differently angled ramp surfaces are active for thrusting and traction, wherein sections act with different slopes.

8. The clutch as recited in claim 7, wherein the transition between the sections of the different slopes of the ramp surfaces is rounded.

9. The clutch as recited in claim 5, wherein a second spring element is arranged between the ramp ring of the main clutch and the ramp ring of the pre-clutch.

10. The clutch as recited in claim 5, wherein a spring means and a damping means is arranged between the ramp ring of the main clutch and a clutch basket of the main clutch.

11. The clutch as recited in claim 5, wherein a spring means or a damping means is arranged between the ramp ring of the main clutch and a clutch basket of the main clutch.

12. The clutch as recited in claim 1, wherein the bearing is designed as a roller bearing, comprising an outer bearing shell, a plurality of bearing pins and an inner bearing shell, wherein the clamping means is effectively connected to the outer and inner bearing shell.

13. The clutch as recited in claim 1, wherein the bearing is designed as a roller bearing, comprising an outer bearing shell, a plurality of bearing pins and an inner bearing shell, wherein the clamping means is effectively connected to the outer or inner bearing shell.

14. The clutch as recited in claim 1, wherein the means for generating the basic friction in the bearing is designed such that the basic friction decreases as the torsion between the pre-clutch and main clutch increases.

15. A clutch comprising:
a pre-clutch including:
a first clutch basket including a first ramp ring;
a first clutch hub arranged to non-rotatably connect to a transmission shaft;
a first disc non-rotatably connected to the first clutch basket;
a second disc non-rotatably connected to the first clutch hub; and,
a spring;
a main clutch including:
second clutch basket with a second ramp ring;

a second clutch hub arranged to non-rotatably connect to an engine output;
a third disc non-rotatably connected to the second clutch basket;
a fourth disc non-rotatably connected to the second clutch hub; and,
at least one ball or roller disposed between the first and second ramp rings and in contact with the first and second ramp rings, wherein:
the first and second ramp rings are directly connected only by the at least one ball or roller.

* * * * *